Nov. 22, 1938.  J. M. NOVAK  2,137,582
FLY TRAP
Filed April 21, 1938   2 Sheets-Sheet 1
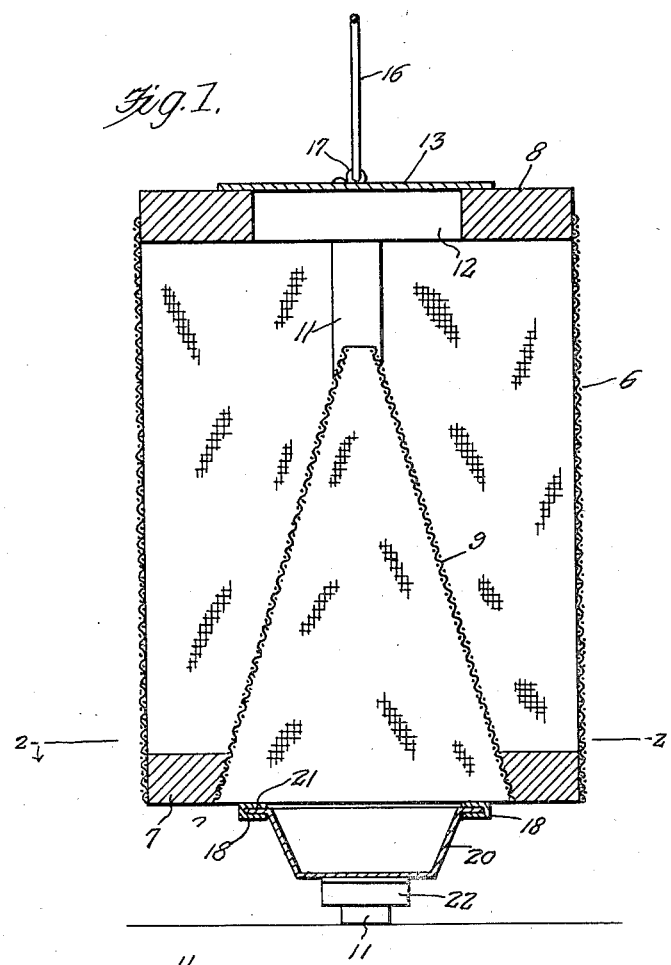
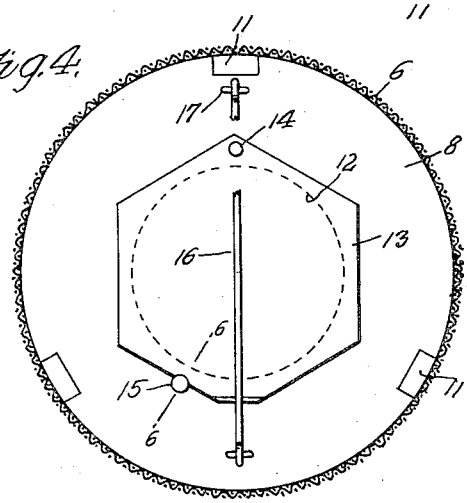
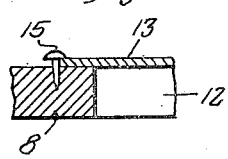
Inventor
Joseph M. Novak.
By Clarence A. O'Brien
and Hyman Berman
Attorneys Nov. 22, 1938. J. M. NOVAK 2,137,582
FLY TRAP
Filed April 21, 1938 2 Sheets-Sheet 2
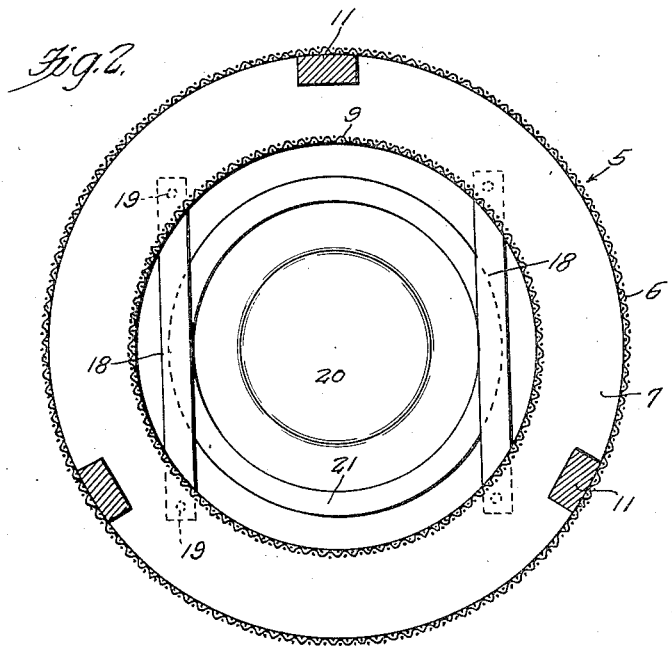
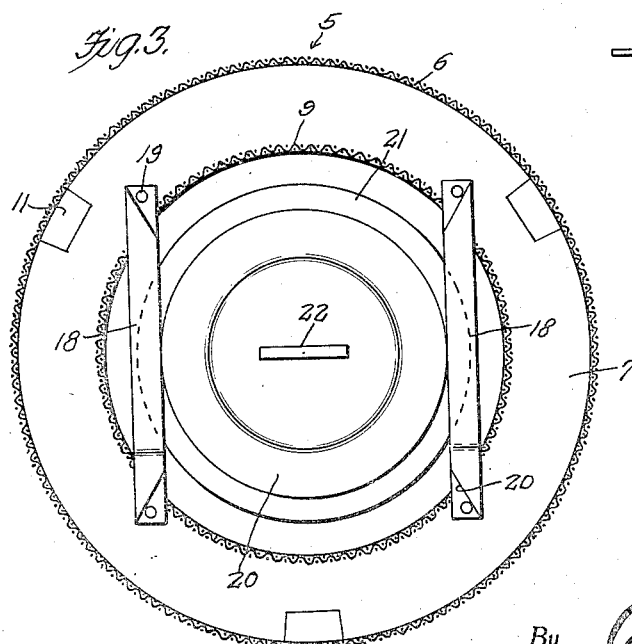
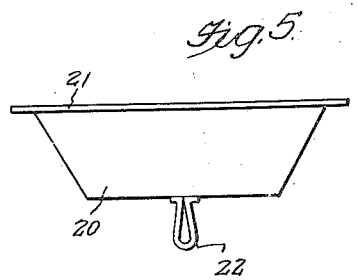
Inventor
Joseph M. Novak
By Clarence A. O'Brien
and Hyman Berman
Attorneys Patented Nov. 22, 1938

2,137,582

UNITED STATES PATENT OFFICE 2,137,582

FLY TRAP

Joseph M. Novak, Wagner, S. Dak.

Application April 21, 1938, Serial No. 203,424

1 Claim. (Cl. 43—118)

This invention relates to traps of the type generally employed for catching flies and similar insects.

An object of the present invention is to provide a trap of the character above mentioned which while cheaply and economically constructed will fulfill, in a positive and efficient manner, the functions of a trap of this character.

The invention together with its objects and advantages will be best understood from a study of the following description taken in connection with the accompanying drawings wherein:—

Figure 1 is a vertical sectional view through the trap,

Figure 2 is a horizontal sectional view taken substantially on the line 2—2 of Figure 1, Figure 3 is a bottom plan view of the trap, Figure 4 is a top plan view of the trap on a reduced scale, Figure 5 is an elevational view of a bait pan, and Figure 6 is a detail sectional view taken substantially on the line 6—6 of Figure 4.

Referring to the drawings by reference numerals it will be seen that the trap comprises a cylinder 5 that embodies a peripheral wall 6 of screen or other suitable reticulated material, a bottom member 7, and a top member 8.

Members 7 and 8 may be formed from single blanks of wood cut in circular form and the bottom member 7 is provided with a relatively large opening 8 that serves as an entrance opening for the trap. The wall of the opening 8 is inclined as shown so that the opening 8 conformably accommodates therein the largest end of a cone 9 of wire or other reticulated material that extends inwardly of the cylinder or casing 6 from the bottom 7 thereof. Cone 9 is open at its upper and lower ends as shown.

The peripheral wall 6 is secured to the top and bottom members 8 and 7 in any suitable manner and the top and bottom members 7 and 8 are secured in spaced relation relative to one another through the medium of vertical strips 11 that are circumferentially spaced and serve to reinforce the wall 6 of the trap. The strips 11 have the upper and lower ends thereof fitting in notches provided therefor in the top and bottom members 8 and 7 of the trap.

The top member 8 of the trap is also provided with an opening 12 which serves as a clean-out opening for the trap, and for the opening 12 there is provided a cover plate 13.

The cover plate 13 is pivoted as at 14 to the top 8 and for releasably retaining the cover member 13 in closed position with respect to the opening 12 there is provided on the top 8 a headed stud 15 which accommodates between the head thereof and the top 8 an edge portion of the cover plate 13 in a manner shown in Figures 4 and 6.

Also for the trap there is provided a bail 16 which at its opposite end is secured to the top 8 of the trap through the medium of eye bolts or the like 17. Bail 16 serves admirably for carrying the trap and also as a means for suspending the trap from a ceiling or other suitable support.

Disposed across the opening 10 in the bottom of the trap is a pair of spaced parallel channel strips 18 which at their ends are secured to the underside of the bottom 7 by nails or other fastening elements 19. The lower flanges of the channel members 18 at the respective opposite ends of the respective channel members are cut on a bias as at 20 to facilitate engaging the rim 21 of a pan 20 therewith, and also to facilitate removal of the pan 20.

Pan 20 on the bottom thereof is provided with a handle 22 to facilitate manipulation of the pan incidental to the positioning of the pan in engagement with the strips 18 in alignment with the cone 9, and the disengagement of the pan and removal thereof.

The pan 20 is adapted to accommodate suitable bait that will afford an attraction for the flies and insects.

Obviously the flies or insects, in actual practice, will enter the trap through the bottom end of the cone 9, and the flies ultimately passing from the cone 9 into the cylinder or casing 5 of the trap will become entrapped therein.

It is thought that a clear understanding of the construction, utility and operation of a trap of this character will be had without a more detailed description.

Having thus described the invention what is claimed as new is:—

A fly-trap comprising a substantially cylindrical casing having a reticulated peripheral wall and also having a bottom wall provided with an enlarged opening, a reticulated conical member open at its respective opposite ends and having an enlarged end fitting snugly within said opening, a pair of channel strips secured to the underside of said bottom wall in spaced parallel relation and extending across said opening, and a downwardly tapering bait pan of circular shape in cross section and having a rim engageable in the channels of said strips for cooperation with said strips for supporting the pan at the bottom of the trap close to the lower end of the cone and said pan being of much less diameter than the diameter of the lower end of the cone, and said trap also having a top wall provided with a clean-out opening, and a cover plate for said clean-out opening.

JOSEPH M. NOVAK.